US009201490B2

(12) United States Patent
Bose et al.

(10) Patent No.: US 9,201,490 B2
(45) Date of Patent: Dec. 1, 2015

(54) POWER MANAGEMENT FOR A COMPUTER SYSTEM

(71) Applicant: International Business Machines Corporation, Armonk, NY (US)

(72) Inventors: Pradip Bose, Yorktown Heights, NY (US); Bruce M. Fleischer, Bedford Hills, NY (US); Thomas W. Fox, Hopewell Junction, NY (US); Hans M. Jacobson, White Plains, NY (US); Ravi Nair, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 13/837,655

(22) Filed: Mar. 15, 2013

(65) Prior Publication Data
US 2014/0281605 A1    Sep. 18, 2014

(51) Int. Cl.
*G06F 1/26* (2006.01)
*G06F 1/32* (2006.01)
*G06F 9/48* (2006.01)
*G06F 9/44* (2006.01)

(52) U.S. Cl.
CPC ............ *G06F 1/3243* (2013.01); *G06F 1/3228* (2013.01); *G06F 9/4893* (2013.01); *G06F 1/3234* (2013.01); *G06F 1/3275* (2013.01); *G06F 1/3278* (2013.01); *G06F 9/44* (2013.01)

(58) Field of Classification Search
CPC ....... G06F 1/3234; G06F 1/3275; G06F 9/44; G06F 1/3287
See application file for complete search history.

(56) References Cited

U.S. PATENT DOCUMENTS

| | | | |
|---|---|---|---|
| 2007/0079161 A1* | 4/2007 | Gupta | 713/324 |
| 2010/0042585 A1* | 2/2010 | Adler | 707/3 |
| 2010/0257436 A1* | 10/2010 | Asauchi | 714/805 |
| 2010/0274953 A1* | 10/2010 | Lee et al. | 711/103 |
| 2010/0313052 A1* | 12/2010 | Ueda | 713/324 |

* cited by examiner

*Primary Examiner* — Jaweed A Abbaszadeh
*Assistant Examiner* — Xuxing Chen
(74) *Attorney, Agent, or Firm* — Cantor Colburn LLP

(57) ABSTRACT

Embodiments include a method for managing power in a computer system including a main processor and an active memory device including powered units, the active memory device in communication with the main processor by a memory link, the powered units including a processing element. The method includes the main processor executing a program on a program thread, encountering a first section of code to be executed by the active memory device, changing, by a first command, a power state of a powered unit on the active memory device based on the main processor encountering the first section of code, the first command including a store command. The method also includes the processing element executing the first section of code at a second time, changing a power state of the main processor from a power use state to a power saving state based on the processing element executing the first section.

9 Claims, 5 Drawing Sheets

POWER MANAGEMENT FOR A COMPUTER SYSTEM

BACKGROUND

The present invention relates generally to computer processing and memory, and more particularly to power management for in memory computing.

Computer systems often require a considerable amount of high speed memory, such as random access memory (RAM), to hold information (e.g., data and programs) when a computer is powered and operational. Memory device demands have continued to grow as computer systems have increased in performance and complexity. As devices increase in complexity, managing power used by processing units, such as cores, is an important factor in overall computing performance. In a system with multiple processing units, a first processing unit may consume power while waiting on a result from second processing unit, where the second processing unit may not perform at an optimal speed due to its need for more power.

SUMMARY

Embodiments include a computer program product, system and method for managing power in a computer system including a main processor and an active memory device including powered units, the powered units including a processing element, the active memory device in communication with the processor by a memory link. The method includes the main processor executing a program on a program thread, encountering a first section of code to be executed by the active memory device, changing, by a first command, a power state of a powered unit on the active memory device based on the main processor encountering the first section of code, the first command including a store command. The method also includes the processing element executing the first section of code at a second time, changing a power state of the main processor from a power use state to a power saving state based on the processing element executing the first section of code, a second command changing the power state of the main processor from the power saving state to the power use state based on the processing element completing execution of the first section of code and the main processor executing a second section of code based on changing the power state of the main processor from the power saving state to the power use state.

DETAILED DESCRIPTION

Figure 1:
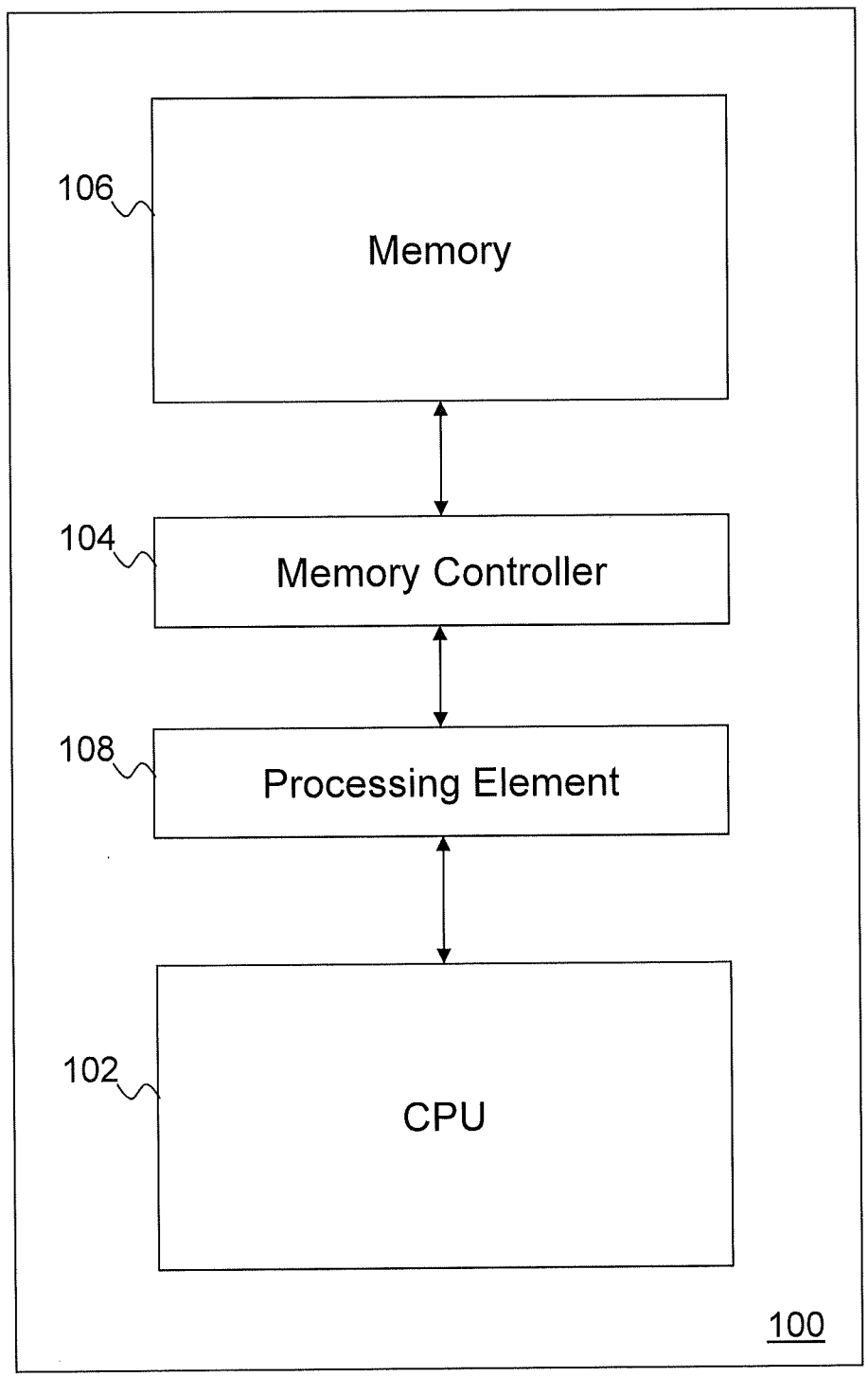
FIG. 1 illustrates a block diagram of a system for active memory in accordance with an embodiment.

An embodiment is directed to power management of a node of a computing system, where the node includes a main processor linked or coupled to an active memory device. The active memory device may be any suitable memory device including one or more memory device (e.g., random access memory "RAM" chips) connected to one or more hub chips (also referred to as a memory controller chips) configured to control the memory device. In an embodiment, the active memory device includes layers of memory that form a three dimensional ("3D") memory device (also referred to as "memory cube") where individual columns of memory chips form stacks or vaults in communication with the hub chip. In one embodiment, a plurality of vaults are located on a memory module, where each vault has a respective hub chip placed beneath the memory chip. The hub chips may each include a memory controller and one or more processing elements ("PEs"). The processing element is configured to communicate with the memory vaults and other processing elements in other hub chips. In an embodiment, a processing element accesses a selected address in a vault through an interconnect network. In one embodiment, a plurality of memory devices, vaults and processing elements may communicate via the interconnect network, including one or more crossbar switch.

In an embodiment, a power management and control system shifts power between the main processor and PEs based on activity migration and observed performance. In an embodiment, activity migration may represent the movement of the execution of code for an application between a first location, such as a main processor, to a second location, such as a PE on an active memory device, where the first location is idle while waiting for a result from the second location. In an embodiment, the actuation of power shifting between processor and powered units on the active memory device (e.g., PEs) is performed through software/firmware commands that control the power states ("Pstates") of the main processor and PEs. In an embodiment, commands from the main processor to set the power states of the active memory device and powered units on the active memory device are delivered over the memory links as a data payload of specified memory stores to memory-mapped I/O ("MMIO") addresses. The MMIO addresses are not in the address range of memory, but instead are associated with the powered units on the active memory device. Therefore, the active memory device recognizes the command as not being a store to regular memory address. In an embodiment load commands may also read the activity, performance, progress or power state of the PEs, where the commands are delivered over the memory links from the main processor to MMIO addresses associated with the powered units, where the active memory device returns the requested state in the payload data response to the load command. In an embodiment, a control loop regularly also reads the activity, performance, progress and/or power state of the main processor and powered units on the active memory devices and makes decisions where to shift power to optimize performance of the system. The control loop may be executed at a fixed frequency. In embodiments, the powered units of the active memory device can initiate an interrupt command that is sent to the power management and control system to improve the power shifting reaction time in response to changes in activity, performance, progress and/or power that occur in the active memory device (e.g., PEs).

In one embodiment, the power supplied to as well as the resulting performance of each processor core and PE is controlled by an operating system ("OS"), hypervisor or processor application through software commands. The portion of the OS, hypervisor or application that controls the power and performance of the processor cores and PEs and other units on the processor and active memory device is referred to as a power management program or thread and can be run as a separate thread or as a function that is part of the OS, hypervisor or application. The software commands can power down main processor resources through on-chip control channels (such as serial communication channels ("SCOM"). The commands can set voltage and/or frequency operating points, throttling modes, resource sizes, memory request priority and other settings of on-chip resources such as cores, caches, buses, memory and network controllers and links. Such commands can, for example, cause some cores and caches of the processor chip to be power gated (switched on or off of a power saving state) to save power, the saved power instead being available to power the computation on the active memory devices. The software commands can power down memory-attached chips, such as active memory devices, by routing commands that are sent as regular memory stores or loads through the memory links to specific MMIO addresses that correspond to powered units of the active memory devices. Such stores to MMIO addresses are received by a link controller on the active memory device and forwarded by a local power management controller to the intended destination resource on the chip based on the address. The commands can set voltage and/or frequency operating points, throttling modes, resource sizes and memory request priority of on-chip resources such as PEs, caches, crossbars, vault and link controllers.

The power management system also enables collection of power states of various devices in the computing system nodes. In an embodiment, the OS, hypervisor, and/or application uses software commands to check the power and performance states of main processor and active memory devices. The software commands may read actual power from the off-chip voltage regulator modules (VRM) over serial communication channels. In an embodiment, the software commands read the performance and power state from performance counters and power proxies on the processor chip through on-chip control channels (e.g., SCOM). The performance counters can, for example, track the number of instructions issued in a processor core or PE, or the utilized memory bandwidth. As power is related to activity in a logic circuit, by using such performance counters to gauge the activity, a power proxy circuit can estimate the amount of power being used by the processor or active memory device and their sub-components. In addition, software commands read the performance, progress and power state from performance/progress counters and power proxies on the active memory device through use of memory loads to special MMIO addresses. These software commands include store commands or load commands. The load commands to MMIO addresses are intercepted by the link controller on the active memory device and the requested data is collected from the relevant counters and proxies and is then formatted and communicated back to the processor as the data payload of the response to the load request.

In addition, the power management system may utilize interrupts to reduce delay in power shifting and further improve performance. In an embodiment, significant performance and/or power changes in active memory device are communicated to the OS, hypervisor or application through software interrupts. A local power management controller on the active memory device collects performance and power statistics of PEs, interconnect, links and other elements. In an embodiment, if a programmable threshold in performance or power is reached, a message is initiated by the controller and sent to the main processor chip. Hardware on the processor chip interprets the message from the active memory device and generates an interrupt to the software thread that controls power management (e.g., the OS, hypervisor or application). In an embodiment, the OS, hypervisor or application can use data passed along in the message to make a decision or poll the state of the chip that sent the message to get more information.

The active memory device may be any suitable memory device including a plurality of memory elements (e.g., chips) connected to a logic portion and a processing element. In an embodiment, the active memory device includes layers of memory that form a three dimensional ("3D") memory device (e.g., a memory cube) where individual columns of chips form vaults in communication with the processing element and logic. The active memory device may include a plurality of processing elements configured to communicate to the chips and other processing elements. In an embodiment, a processing element accesses a selected address in a vault through an interconnect network. In addition, the interconnect network provides a communication path between processing elements and vaults on the active memory device as well as between processing elements and a main processor. Each vault may have an associated memory controller or logic unit that is also coupled to the interconnect network.

Embodiments include an active memory device that can perform a complex set of operations using multiple locations (e.g., data stored at specific addresses) within the active memory device as operands. Further, a process is provided whereby the instructions and operations are performed autonomously on these operands within the active memory device. Specifically, the instructions are stored within the active memory device itself and are not executed by a main processor. The stored instructions are provided to the processing elements for processing by the processing element in the active memory device. In one embodiment, the processing elements are programmable engines, including an instruction buffer, an instruction unit with branching capability and instruction decode, a mixture of vector, scalar, and mask register files, a plurality of load/store units for the movement of data between memory and the register files, and a plurality of execution units for the arithmetic and logical processing of various data types. Also included in the active memory device are address translation capabilities for converting virtual addresses to physical addresses, a unified Load/Store Queue to sequence data movement between the memory and the processing elements, and a processor communications unit, for communication with the main processor.

In an embodiment, the active memory device is configured to load configuration information or instructions from a part of the active memory device into a processing element following receiving a command from an external requestor, such as a main processor or another processing element. In addition, the processing element may perform virtual-to-real address translations that are computed while executing the loaded instructions. In an example, when performing a load instruction, the active memory device accesses an operand from a memory location and places the operand in a register in the processing element. A virtual address of the memory location is generated by the load instruction and is translated into a real address by the processing element. Similarly, when performing a store instruction, the active memory device writes a memory location with the contents (e.g., an operand) in a register in the processing element. A virtual address of the memory location is generated by the store instruction and is translated into a real address by the processing element.

Embodiments of the processing element in the active memory device also have the ability to read or to write operands in any part of the active memory device through the interconnect network. Specifically, a processing element may access other vaults in the active memory device using the interconnect network. In an embodiment, processing elements are pooled and coupled to the vaults via the interconnect network, where the processing elements are not physically located in the vault stack. In an embodiment, the interconnect network is a coupling device, such as a crossbar switch, configured to connect any processing element to any memory vault, provided the processing element and memory vault are coupled to the interconnect. In an embodiment, the interconnect network may couple a plurality of active memory devices, where the interconnect network provides a communication path between processing elements and memory vaults of separate devices.

In one embodiment, the processing element is included with the memory controller as part of the stack. In addition, the processing element may perform complex arithmetic and logic operations on the operands, and read and write end results back to locations in memory. The active memory device may return a single result value or signal to the main processor indicating that the results of the desired complex operation are ready in the active memory device, thus performing the high bandwidth processing on the active memory device and using a lower bandwidth communication between the active memory device and main processor.

The processing capabilities within an active memory device may reduce memory latency and energy consumption that would otherwise be experienced when memory is accessed by a processor residing in a separate chip. Instead of bringing data from memory to the separate processing chip through lower bandwidth communication paths, performing what is often quite simple calculations on the data, and then transferring the processed data back to memory, the main processor can configure the processing elements within the active memory device, and then instruct them to carry out the data processing tasks. This may be achieved by sending one or more commands from the main processor to the active memory device. In this scenario, the movement of data between the location where the data processing is performed and memory is greatly reduced, both in the distance it has to travel from the memory to the data processing location, and in the number of levels of cache traversed through a memory hierarchy.

FIG. 1 illustrates a block diagram of a system for storing and retrieving data in a memory in accordance with an embodiment. A system 100 depicted in FIG. 1 includes a computer processor (CPU) 102, a memory 106 having memory devices, as well as a memory controller 104 and processing element 108 for receiving and processing data from the computer processor 102 to be stored in the memory 106.

The memory controller 104 may be in communication with the computer processor 102 and receive write requests from the computer processor 102 without using functions of the processing element 108. The write requests contain data to be written to the memory 106 and a real address for identifying the location in the memory 106 to which the data will be written. The memory controller 104 stores data at a real address within the memory 106. The computer processor 102 can map the virtual address to a real address in the memory 106 when storing or retrieving data. The real address for a given virtual address may change each time data in the memory 106 is modified.

In an embodiment, the processing element 108 is in communication with the computer processor 102 and receives a command from the computer processor 102. The command may correspond to instructions stored in the memory 106 to perform write requests for data to be written to the memory 106. The command may also include a virtual address for identifying the location in the memory 106 to which the data will be written. The memory controller 104 and/or processing element 108 stores data at a real address within the memory 106. In an embodiment, the processing element 108 maps the virtual address to a real address in the memory 106 when storing or retrieving data. As described in further detail below, the computer processor 102 provides commands to the memory 106, where the processing element 108 receives the command and fetches corresponding instructions from the memory 106. The system 100 is one example of a configuration that may be utilized to perform the processing described herein. Although the system 100 has been depicted with only a single memory 106, memory controller 104, processing element 108 and computer processor 102, it will be understood that other embodiments would also operate in other systems with two or more of the memory 106, memory controller 104, processing element 108 or computer processor 102. In an embodiment, the memory 106, memory controller 104, processing element 108 and computer processor 102 are not located within the same computer. For example, the memory 106, processing element 108 and memory controller 104 may be located in one physical location (e.g., on a memory module) while the computer processor 102 is located in another physical location (e.g., the computer processor 102 accesses the memory controller 104 and/or processing element 108 via a network). In addition, portions of the processing described herein may span one or more of the memory 106, memory controller 104, processing element 108 and computer processor 102.

Figure 2:
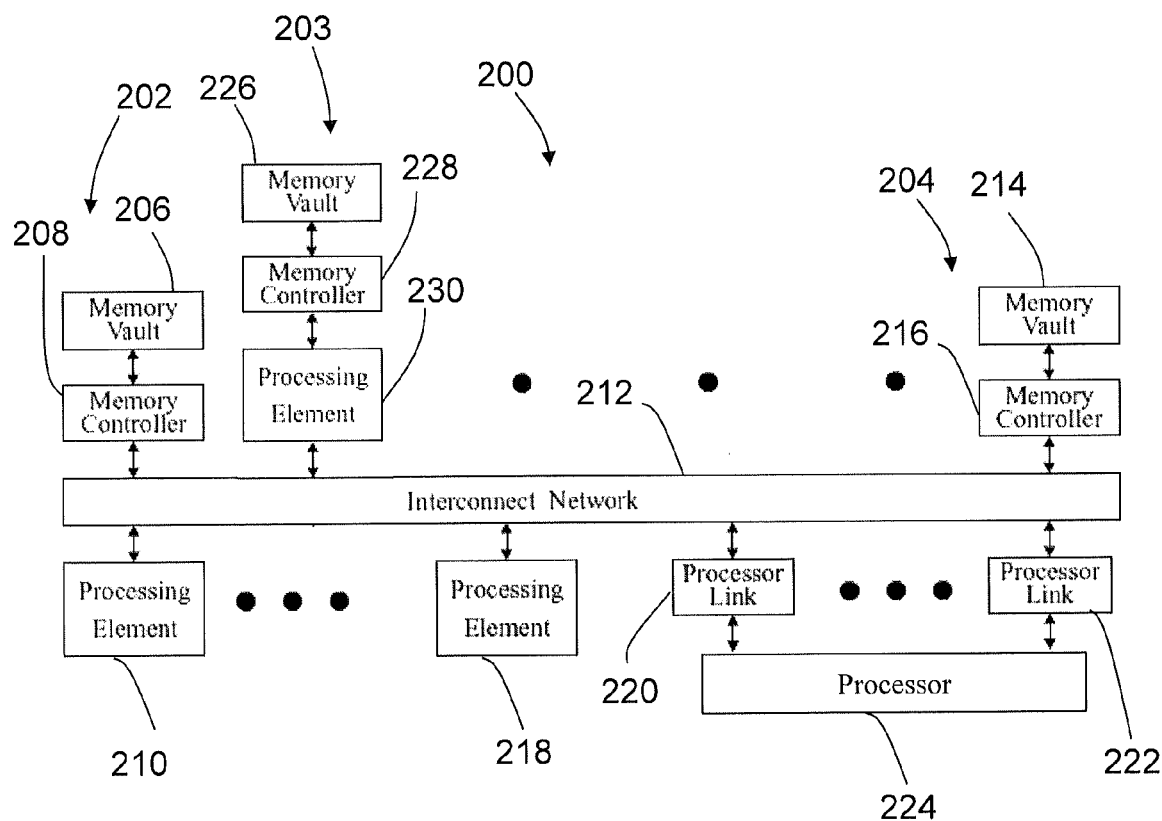
FIG. 2 illustrates a block diagram of a memory system with active memory in accordance with an embodiment.

FIG. 2 is a schematic diagram of an embodiment of a computer system 200 implementing active memory. In one embodiment, the computer system 200 includes an active memory device 202, an active memory device 203 and an active memory device 204. The active memory device 202 includes a memory vault 206, a memory controller 208 and a processing element 210. In an embodiment, the processing element 210, memory vault 206 and memory controller 208 are coupled and communicate via an interconnect network 212. Specifically, the processing element 210 communicates to the memory vault 206, memory controller 208 and other memory devices, such as active memory devices 203 and 204, via the interconnect network 212. The interconnect network 212 is also coupled to a main processor 224 by processor links 220 and 222. The interconnect network 212 provides a fast and high bandwidth path for communication between portions of the device, such processing elements, memory controllers and memory, to provide improved performance and reduced latency for the active memory.

The active memory device 203 includes a memory vault 226, a memory controller 228 and a processing element 230. In an embodiment, the processing element 230, memory vault 226 and memory controller 228 are all located on the same side of the interconnect network 212, such as within a single stack. By positioning the processing element 230 in the same stack as memory vault 226, the latency is reduced when accessing locations in the memory vault 226, thus further improving performance. In one embodiment, the active memory 204 includes a memory vault 214 and memory controller 216 coupled to processing element 210 and processing element 218 via the interconnect network 212. As depicted, the processing element 218 is located on the other side of the interconnect network 212 from the memory controller 216 and memory vault 214. In embodiments, the active memory devices 202, 203 and 204 include multiple layers of stacked addressable memory elements. Further, the stacks memory may be divided into memory vaults 206, 226 and 214, or three-dimensional blocked regions of the memory device which share a common memory controller and/or memory element, and are capable of servicing memory access requests to their domain of memory independently of one another.

In embodiments, the processing elements, memory vaults and memory controllers may be arranged in a suitable manner depending on the application. For example, one or more processing elements, such as processing element 218, may be positioned on one side of the interconnect network 212 and may operate as a pool of processing elements that are available for accessing any memory in the memory system coupled to the interconnect network 212. The pooled processing elements are not limited to accessing a particular memory vault and, thus, one or more elements may be utilized upon receiving a command from the main processor 224. Accordingly, processing element 218 may be configured to access each memory vault 206, 226 and 214. In another embodiment, one or more processing element, such as processing element 230, is located as part of a stack including a memory vault 226 and memory controller 228. In such a configuration, the processing element 230 is configured to access memory vault 226 coupled to the interconnect network 212, including memory vaults 206 and 214. In one embodiment, one or more processing element, such as processing element 210, is positioned on an opposite side of the interconnect network 212 from the memory vault 206 and memory controller 208. In the configuration, the processing element 210 is configured to access any memory coupled to the interconnect network 212, including memory vaults 226 and 214.

In an embodiment, the computer system may include a plurality of active memory devices, such as the active memory devices 202, 203 and 204. Further, each active memory device may include a plurality of stacks, each stack including a memory vault, memory controller and associated processing element. In one example, the number of processing elements may be greater than the number of memory vaults. In another embodiment, the memory devices may include fewer processing elements than memory vaults. In embodiments, the processing elements are pooled and available to access any memory in the system. For example, a memory device may include 16 memory vaults and memory controllers, but only eight processing elements. The eight processing elements are pooled, and utilized as resources for accessing any memory vaults coupled to the interconnect network. In another example, a memory device may be passive, where the device is controlled by processing elements of active memory devices coupled to the interconnect network.

Figure 3:
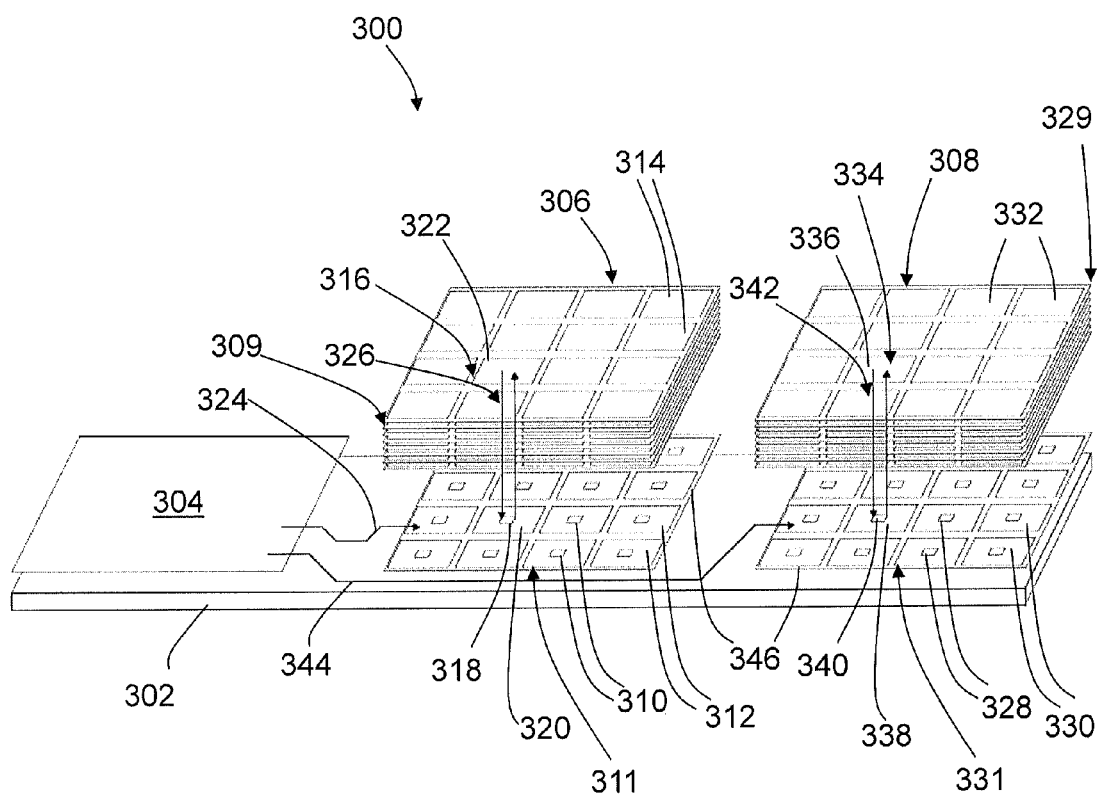
FIG. 3 illustrates a schematic diagram of a memory system with active memory in accordance with an embodiment.

FIG. 3 is a diagram of an exemplary computer system 300 implementing active memory. The computer system 300 includes a circuit board 302, a main processor 304, active memory device 306 and active memory device 308. The active memory device 306, active memory device 308 and main processor 304 are disposed on the circuit board 302. As depicted, portions of the active memory devices 306 and 308 are exploded to show details of the computer system 300 arrangement. The active memory devices 306 and 308 communicate to the main processor 304 via signal paths 324 and 344, respectively. As depicted, the active memory 306 device is arranged in layers, where a base layer 311 includes a plurality of memory controllers 310 and processing elements 312. For example, the active memory device 306 includes layers 309 of memory placed on top of the base layer 311, where the layers 309 each have a plurality of memory elements. As depicted, the base layer 311 also includes an interconnect network 346 to enable high bandwidth communication between memory, memory controllers and processing elements in the device.

In an embodiment, the active memory device 306 includes a plurality of memory vaults 314, where each memory vault 314 includes a memory element from each layer 309, the memory vaults 314 positioned adjacent to memory controllers 310 and processing elements 312. Specifically, the exemplary active memory device 306 includes layers of 16 memory elements, where the element layers form stacks, including a stack 316, where the stack 316 includes a memory vault 322 disposed above a memory controller 318 and a processing element 320. A high bandwidth communication path 326 provides a high bandwidth, direct and substantially reduced length (e.g., as compared to paths 324, 344) communication path between the processing element 320 and memory locations within the memory vault 322, thus reducing latency and power consumption for memory accesses. For example, the processing element 320 may receive a command from the main processor 304, load instructions from within the active memory device 306 based on the command, and, as part of the loaded instructions, access data at a location in the memory vault 314 and perform a complex operation on the data in the processing element 320. Further, the processing element 320 may also store data, such as the result, in the memory vault 314 and transmit a value or signal to the main processor 304 following execution of the command. In an embodiment, the processing element 320 stores or writes data (e.g. an operand) from a register in the processing element 320 to the memory vault 314. The processing element 320 is also configured to translate addresses from virtual-to-real and real-to-virtual as part of the read or store operations. Thus, the processing element 320 provides instruction loading, address translation, complex operations and other tasks local to the memory to reduce latency, save power and free up the main processor 304 to perform other tasks.

Similarly, the active memory device 308 includes a plurality of memory controllers 328 and processing elements 330 disposed on a base layer 331. In an embodiment, the active memory 308 includes layers 329 of memory devices placed on top of the base layer 331, where the layers 329 each have a plurality of memory devices. The base layer 331 also includes an interconnect network 346 to enable high bandwidth communication between memory and processing elements in the device. In an embodiment, the interconnect networks 346 of active memory device 306 and active memory device 308 are coupled and allow communication between processing elements and memory on separate devices.

In an embodiment, the active memory device 308 includes a plurality of memory vaults 332, where each memory vault 332 includes a memory element from each layer 309, the memory vaults 332 are positioned adjacent to memory controllers 328 and processing elements 330. The exemplary active memory device 308 includes 16 stacks, including stack 334, where the stack 334 includes a memory vault 336 disposed above a memory controller 340 and a processing element 338. A high bandwidth communication path 342 provides communication between the processing element 330 and memory locations within the memory vault 336.

Figure 4:
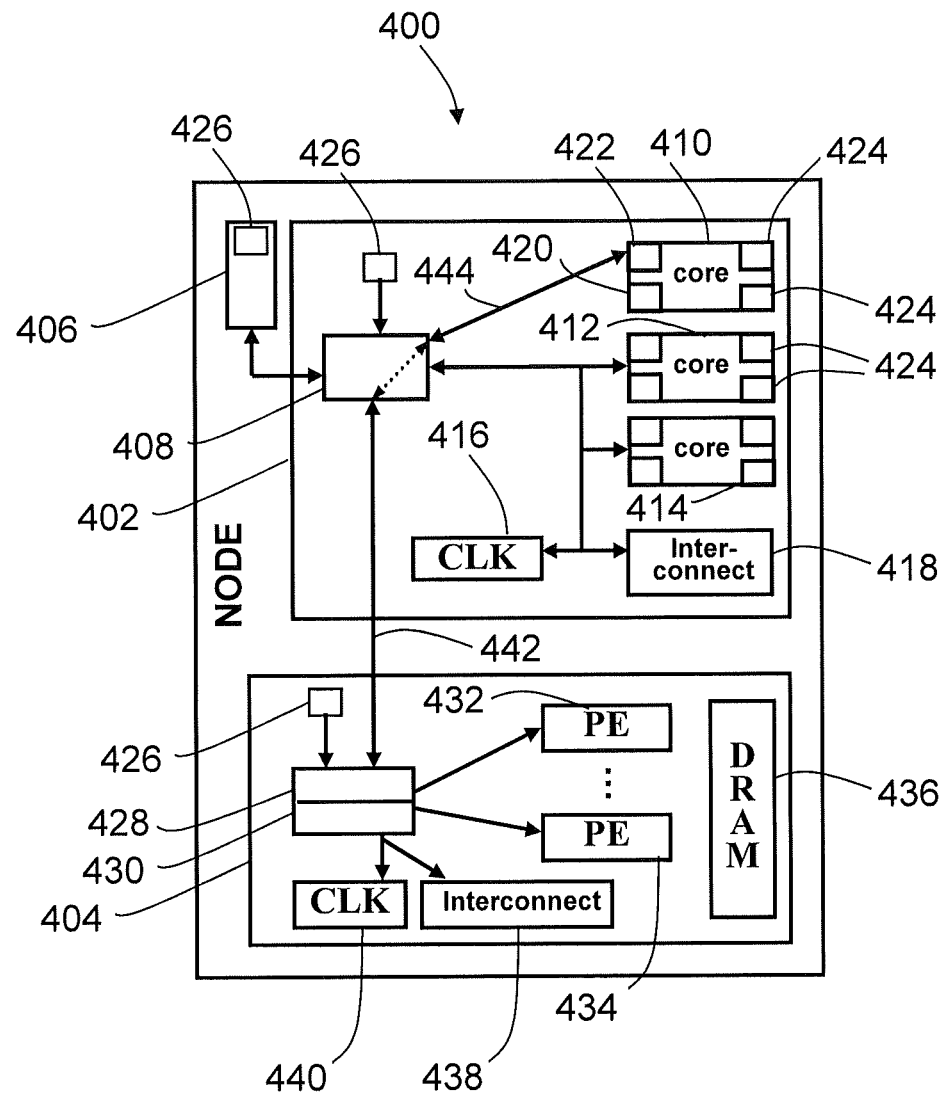
FIG. 4 illustrates a block diagram of a node of a computer system in accordance with an embodiment.

FIG. 4 depicts an exemplary node 400 of a computing system. The node 400 depicts an embodiment of at least a portion of the systems shown in FIGS. 1-3. The node 400 includes a main processor 402, an active memory device 404 and a voltage regulator module 406. The main processor 402 includes a main power management controller ("main PM controller") 408, core 410, core 412 and core 414. The main processor 402 also includes a clock 416 and an interconnect 418, where the interconnect may include one or more crossbar switches and logic to control the switches that connect elements of the main processor 402. The node 400 also includes a plurality of sensors 426 placed throughout the node to monitor parameters, such as temperature, that may be used to make power management decisions. The active memory device 404 includes a link controller 428, a local power management controller 430 ("local PM controller"), a first processing element 432 and a second processing element 434. The active memory device 404 also includes a memory 436, such as a DRAM, an interconnect 438 and a clock 440. The interconnect 438 may include one or more crossbar switches and logic to control the switches that connect elements of the active memory device 404. The link controller 428 communicates with the main processor 402 via one or more memory links 442, the memory links being regular memory links that are used to perform regular loads and stores of data from and to memory (e.g., memory vaults in the active memory device).

In an embodiment, a main power management software or firmware program ("main PM program"), runs on a processor core thread 422. The main PM program can be part of the OS or Hypervisor or run as a separate thread. The main PM program running on core thread 422 communicates with the main PM controller 408 over the on-chip channel 444, and the main PM program and the main PM controller 408 communicate with the local PM controller 430 via the memory link 442 to manage power distribution among components in the node 400. The main PM program running on processor core thread 422 can communicate with the local PM controller 430 directly without involving the main PM controller 408 as indicated by the dotted line connecting channel 444 and link 442 through block 408, for example to power gate PEs which is a function controlled by the main PM program and OS. Additionally the main PM controller 408 can communicate with the local PM controller 430 directly without involving the main PM program, for example to enforce real-time power cap limits.

In an embodiment, the node 400 includes software and/or firmware on the main PM controller 408 and local PM controller 430 that manages power distribution within the node 400. The power distribution is managed to account for activity migration in the node 400. For example, the power management program and controllers may provide increased power to areas experiencing power and performance intensive events, such as PEs executing code, while reducing power to other parts of the node 400 that are performing lower power or no power operations, such as a thread on a main processor core that is idle while waiting for a result from the active memory device 404 or another core. The main PM controller 408 and local PM controller 430 also communicate with the VRM 406 to ensure that power usage is maintained at levels below a maximum level to prevent errors or other issues.

In embodiments, the main PM program, the main PM controller 408 and local PM controller 430 may issue and/or receive interrupts to identify that a power or performance event is occurring on the active memory device 404, where the main PM program, the main PM controller 408 and local PM controller 430 may change power states of components in the node 400 based on the event. For example, if an application running on the main processor 402 encounters a section of code to be executed by the active memory device 404, an interrupt may be generated by the application and received by the local PM controller 430. The local PM controller 430 may then change the power states of PEs that are allocated to perform the section of code from a power saving state to a power use state, thus increasing power provided to the PEs to improve performance. In addition, the main PM program or the main PM controller 408 may set the main processor cores 410, 412, 414 to a power saving state if they are not executing code or executing less performance-critical code while waiting on an input from another portion of the node 400. In embodiments, any of the elements in the active memory device 404 may have a power state changed based on communications received by the local PM controller 430. In an embodiment, the clock 440, interconnect 438, link controller 428 and associated memory link 442, first PE 432 and second PE 434 may be referred to as "powered units" that have their power states changed based on communications to and from the local PM controller 430.

In embodiments, communications between the main PM program or main PM controller 408 and local PM controller 430 are across the memory link 442, where load or store commands are used to change power states of the powered units. A store command may have a payload section and an address section, where the address specified for the store command specifies the powered unit that is to change its power state. In embodiments, the "power saving state" for elements of the node, such as for the main processor, may be a state where the processor is inactive and is powered down or it may be a state where the processor can still actively execute code but in a lower power mode. The power saving state for processing elements may be a sleep or idle state where the PEs are inactive until requested for use by an application. The address specified is outside the range of addresses of the memory 436, therefore the link controller 428 recognizes that the command is for the local PM controller 430. The payload section of a store command specifies the change to the power state for the specified powered unit. A payload of a response to a load command is used to specify performance and/or power use information requested by the main or local PM controllers, where the address specifies the powered unit for the requested information. By using the existing memory link 442, which is a regular memory link, and load/store commands used for regular memory communications, the power management system provides a simple and low latency power management implementation.

Figure 5:
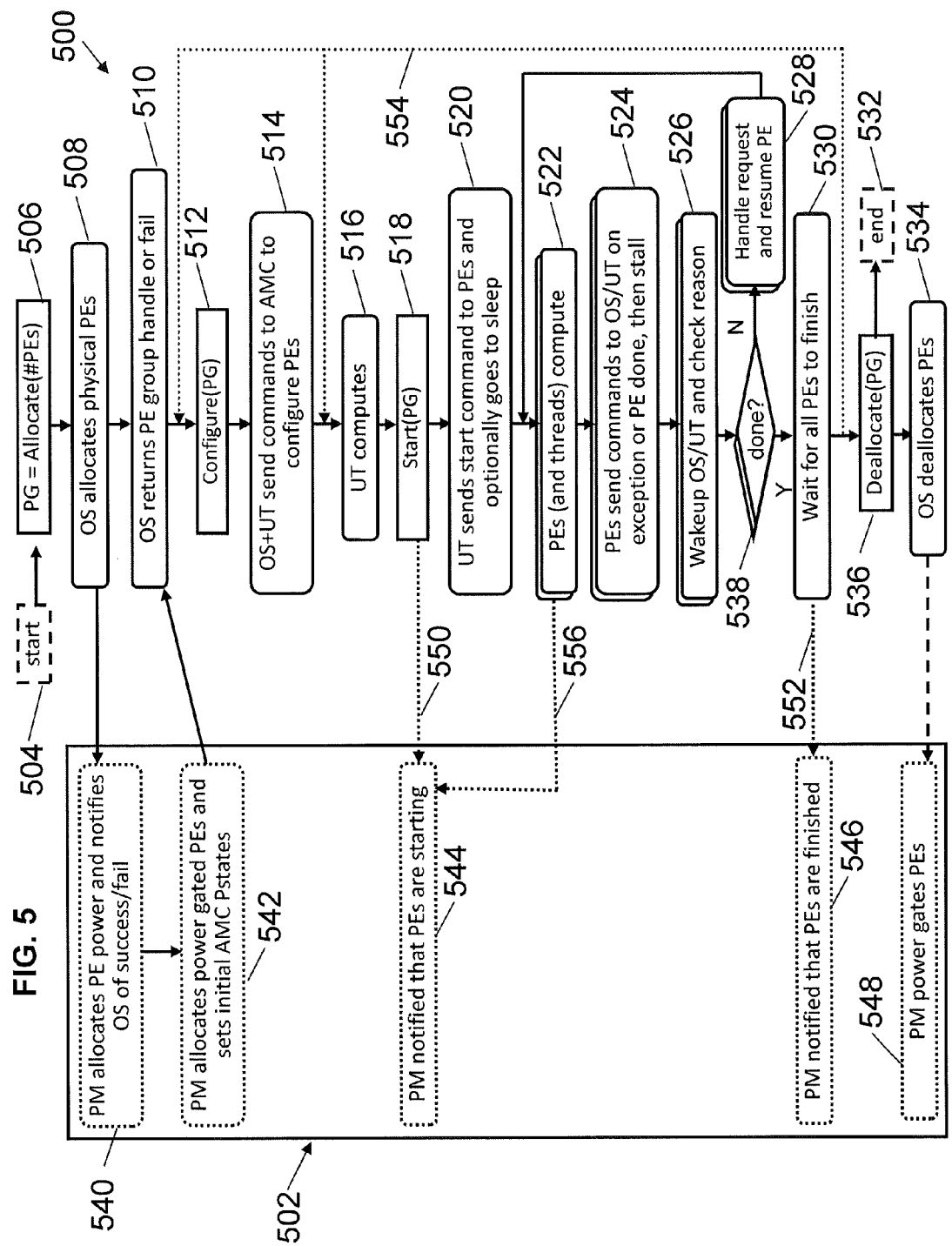
FIG. 5 illustrates a flow chart of a method for power management in a computer system in accordance with an embodiment.

FIG. 5 is a flow chart of an exemplary method, computer program product and system for power management in a computer system having an active memory device. A main application performs a first set of blocks 500 while a power management routine (e.g., software or firmware) performs a second set of blocks 502. The main application and power management may each operate on a separate thread. Furthermore, the main application may contain parallel segments of code that execute simultaneously on multiple threads, such a thread executing a portion of the main application is referred to as a user thread (UT) or simply as "the application". As the application is executing it may enter a section of code where it is beneficial to execute some of the code on the active memory device. The beginning of such a section of code is marked in block 504. In block 506, the application requests an operating system ("OS") to allocate processing elements ("PEs") for the application, where a handle provided for the group of allocated PEs is a PE group ("PG"). The allocation of PE's is typically considered a privileged action and is therefore handled by the OS. In block 540, the power management routine executed by a power management thread ("PM" thread) is notified of the allocated PEs by the OS and allocates power for the PEs to be used and notifies the OS if it was successful in allocating power. In block 542, the PM thread powers up PEs for use by the application, where the PEs are in a power saving state. The PM thread also sets the initial power states ("Pstates") for the allocated PEs. The OS may identify what PEs are already allocated to other applications or threads and determine which PEs are available to the requesting application. In block 510, the PM thread communicates to the OS whether it was successful in allocating power for the PE Group and, if it was successful, the OS provides the PE Group handle to the application. In block 512, a configuration of the allocated PE Group is initiated by a configuration function. In block 514, the application and OS provide one or more configuration commands to configure the allocated PE Group, where the configuring includes loading instruction buffers and setting state information for the PEs located in an active memory device. In block 516, the user thread executes code for the application. In block 518, the application encounters a first section of code to be executed by the allocated PE Group and starts use of the PE Group by a start function. A software interrupt may be generated by the application, shown by line 550 and block 544, to communicate to the PM thread that use of the PE Group has started. Based on this interrupt, the PM thread may preemptively shift power usage by reducing power to the processor, such as by dynamic frequency scaling of voltage to the processor cores, thus freeing up more power for use by powered units (e.g., PEs) on the active memory device.

In block 520, the user thread sends a start command to the PEs in the PE Group. In an embodiment, the user thread may change to a power saving or "sleep" state. In blocks 522, 524, 526, 528 and 538 a plurality of PEs are computing in parallel to perform the actions described. Line 556 is an interrupt that is generated by the active memory device to the PM to indicate that the PEs have started executing, where the PM shifts power to enhance performance. In block 522, the PEs are computing by executing the first section of code. In an embodiment, the user thread(s) may also be computing in the case where the user thread does not change to the power saving state. In block 524, the PEs send commands to the OS or user thread when an exception occurs (e.g., floating point exception, etc.) or when the PE has finished computations. The PE also enters a stalled state, where it waits for the OS and user thread to respond to the commands. In block 526, the application "wakes up" the OS and user thread, such as by an interrupt, if they are in a sleep state, where the OS checks a memory location in the active memory device for a reason for the wake up. Reasons may include that the PE is done executing code or that an exception requires input from the OS. In block 538, the application checks to see if the PE is done computing. In block 528, if the PE is not done, the request specified by the commands is handled and the PE resumes computing to finish executing the first section of code, where the process routes back to block 522. In block 530, the application waits for each of the PEs executing the first section of code to finish. As shown in block 546 and line 552, the active memory device may generate an interrupt to the PM that indicates the PEs are finishing execution. The PM may then shift power usage by providing more power to the main processor core(s), such as by increasing voltage and frequency for the processor. In addition, the PM and active memory device may also speed up or "turbo" the PEs that are still executing by providing increased power to those PEs, as the idle PEs that have finished executing no longer use significant power. As shown by line 554, when the PE Group finishes execution, the application may redirect to block 512 for re-configuring the PE Group for a different section of code to be executed by the PE Group, or re-direct to block 516 to further compute and execute code on the user thread before again using the PE Group with the current configuration. If the PE group is done and is no longer needed, the application deallocates the PE Group by a deallocate function, shown by block 536, and the application code section started in block 504 has finished execution, shown by block 532. In block 534, the OS deallocates the PEs and communicates to the PM to power gate the PE Group (block 548), thus changing the power state of the PE Group from a power use state to a power saving state. The application continues executing on the main processor and may later enter another section of code that is amenable to execute on the active memory device in which case the sequence described above starting in block 504 is repeated for the subsequent section of code.

In addition, throughout the execution of the application, the PM has a control loop that continuously detects activity migration and adjusts power allocation accordingly, including main processor and powered unit Pstates, to improve performance and ensure that power use does not exceed the maximum allowed. The control loop continuously monitors states of the main processor/cores, PEs, interconnects, clocks, VRMs and makes control decisions to shift power in the system. In addition, the control loop may monitor temperature and other parameters that may be used to make power management decisions for the system. The interrupts described above provide improved response (reduced delay) to the power or performance events (e.g., code execution on PEs also called "activity migration") as compared to the PM control loop, thus providing improved performance. In embodiments, the control loop runs in the background while the application, OS and/or active memory device generate interrupts corresponding to the power or performance events. The PM includes an interrupt handler to receive the generated interrupts, where the handler checks the cause of the interrupt to enable to the PM to make power management decisions.

To aid the main PM program and main PM controller in the decision to shift power between the main processor and active memory device hints can be provided by the compiler or an application profiler that provide a predicted power or performance required by the main processor and active memory device for the node to run most performance or energy efficiently for a given section of the application program. Such hints are provided as part of the code of the application and can involve a function call to the OS or main PM program to inform the OS or main PM program of the predicted power and performance requirement. In an embodiment, the memory links enter a power saving state while the PEs on the active memory device are computing, as the expected bandwidth requirement over the memory links is low while the main computation and memory access is performed by the PEs internal to the active memory device. The memory links enter their power use state again when the PEs finish their computation as the memory bandwidth between the main processor and the active memory device is then expected to increase again.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for managing power in a computer system, the computer system comprising:
a main processor and an active memory device including powered units, the active memory device in communication with the main processor by a memory link, the powered unit comprising a processing element and a link controller, the system configured to perform a method comprising:

executing, at the main processor, a program on a program thread;

encountering, at the main processor, a first section of code to be executed by the active memory device;

changing, by a first command, a power state of a powered unit on the active memory device based on the main processor encountering the first section of code, the first command comprising a store command;

executing, by the processing element, the first section of code;

changing a power state of the main processor from a power use state to a power saving state based on the processing element executing the first section of code;

changing, by a second command, the power state of the main processor from the power saving state to the power use state based on the processing element completing execution of the first section of code;

executing, by the main processor, a second section of code based on changing the power state of the main processor from the power saving state to the power use state;

changing the power state of the memory link to a power use state based on the processing element completing execution of the first section of code; and changing the power state of the memory link to a power saving state based on the processing element starting execution of the first section of code.

2. The system of claim 1, wherein changing the power state of the powered unit comprises changing the power state by a power management program or a controller issuing the first command across the memory link to the powered unit.

3. The system of claim 1, wherein an address in the store command specifies an address that corresponds to the powered unit wherein the powered unit is one of the processing element, a memory, a clock, a link controller and an interconnect, the address is not in a memory address range of the memory and a payload in the store command specifies a change to the power state for the powered unit.

4. The system of claim 1, wherein the change in the power state of the main processor and the powered units is based on states of the main processor and powered units, the state comprising one or more of application performance, progress of individual threads and tasks of the application, power use, temperature, resource utilization and type of instructions executed.

5. The system of claim 4, wherein the states of the main processor and powered units are obtained from at least one of: performance counters, progress counters, power proxies, thermal sensors and power supply measurements, or predicted through a compiler or application profiler, wherein a predicted state is embedded in application code as hints to the power management program or controller.

6. The system of claim 1, wherein the powered unit comprises the processing element, the method further comprising changing the power state of the processing element to a power use state based on the processing element starting execution of the first section of code and changing the power state of the processing element to a power saving state based on the processing element completing execution of the first section of code.

7. The system of claim 1, further comprising communicating information in a payload relating to performance and power use of the powered units on the active memory device responsive to a load command issued by a power management program or controller.

8. The system of claim 1, wherein changing, by the first command across the memory link, the power state of the powered unit on the active memory device further comprises changing the power state of the powered unit based on an interrupt received by a power management program or controller.

9. A computer program product for implementing power management in a computer system including a main processor and an active memory device including powered units, the powered units comprising a processing element and a link controller, the computer program product comprising:

a non-transitory storage medium readable by a processing circuit and storing instructions for execution by the processing circuit for performing a method comprising:

executing, at the main processor, a program on a program thread;

encountering, at the main processor, a first section of code to be executed by the active memory device;

changing, by a first command, a power state of a powered unit on the active memory device from a power saving state to a power use state based on the main processor encountering the first section of code, the first command comprising a store command;

executing, by the processing element, the first section of code;

changing a power state of the main processor from a power use state to a power saving state based on the processing element executing the first section of code;

changing, by a second command, the power state of the main processor from the power saving state to the power use state based on the processing element completing execution of the first section of code;

executing, by the main processor, a second section of code based on changing the power state of the main processor from the power saving state to the power use state;

changing the power state of the memory link to a power use state based on the processing element completing execution of the first section of code; and changing the power state of the memory link to a power saving state based on the processing element starting execution of the first section of code.

* * * * *